(12) United States Patent  
Queen et al.

(10) Patent No.: US 10,179,985 B2  
(45) Date of Patent: Jan. 15, 2019

(54) STRUCTURAL TENSIONING SYSTEM

(71) Applicant: GEOBASICS, LLC, Lawrenceville, GA (US)

(72) Inventors: Frank Queen, Lawrenceville, GA (US); William T. Kitchens, Monroe, GA (US)

(73) Assignee: Geobasics, LLC, Lawrenceville, GA (US)

(*) Notice: Subject to any disclaimer, the term of this patent is extended or adjusted under 35 U.S.C. 154(b) by 73 days.

(21) Appl. No.: 15/471,511

(22) Filed: Mar. 28, 2017

(65) Prior Publication Data

US 2017/0275842 A1    Sep. 28, 2017

Related U.S. Application Data

(60) Provisional application No. 62/313,964, filed on Mar. 28, 2016.

(51) Int. Cl.

| | | |
|---|---|---|
| *E21B 17/043* | (2006.01) | |
| *E02D 7/00* | (2006.01) | |
| *E02D 5/22* | (2006.01) | |
| *E02D 5/56* | (2006.01) | |
| *F16B 7/04* | (2006.01) | |
| *F16B 21/04* | (2006.01) | |

(52) U.S. Cl.
CPC ............ *E02D 7/00* (2013.01); *E02D 5/22* (2013.01); *E02D 5/56* (2013.01); *E02D 2300/0026* (2013.01); *F16B 7/0413* (2013.01); *F16B 21/04* (2013.01)

(58) Field of Classification Search
CPC .... E02D 7/00; E02D 5/22; E02D 5/56; E02D 2300/0026; F16B 7/0413; F16B 21/04
See application file for complete search history.

(56) References Cited

U.S. PATENT DOCUMENTS

| | | | | |
|---|---|---|---|---|
| 5,833,399 A | * | 11/1998 | Bullivant | E02D 5/385 405/233 |
| 7,607,865 B2 | * | 10/2009 | Gregory | E02D 27/12 403/296 |
| 7,731,454 B1 | * | 6/2010 | Watson, III | E02D 5/56 405/231 |
| 8,240,957 B1 | * | 8/2012 | Watson, III | E02D 5/56 405/242 |

(Continued)

*Primary Examiner* — Tara Mayo-Pinnock
(74) *Attorney, Agent, or Firm* — Kean J. Decarlo; Womble Bond Dickinson (US) LLP

(57) ABSTRACT

A structural tensioning system for selective coupling to a pier pipe having an elongate threaded rod and a tensioning device. The tensioning device having an elongate body that is configured receive a treaded end of the threaded rod and defines a slot in a distal end portion, a pair of opposed co-axial elongate openings, and a pair of opposed passages that communicate between respective portions of the slot and respective portions of the pair of opposed co-axial elongate openings. A portion of each elongate opening is configured to receive a bolt that is mounted in the pier pipe when the tensioning device is positioned in a tensioning position and portions of the slot, the pair of opposed co-axial elongate openings and the pair of opposed passages are configured to selectively receive the bolt that is mounted in the pier pipe as the tensioning device is moved to the tensioning position.

25 Claims, 13 Drawing Sheets

(56) References Cited

U.S. PATENT DOCUMENTS

| | | | | |
|---|---|---|---|---|
| 8,888,413 B2* | 11/2014 | Seider | ............... | E02D 5/523 405/229 |
| 2016/0186403 A1* | 6/2016 | Tomchesson | ........ | E02D 5/526 405/244 |

* cited by examiner

FIGS. 12 A, B

STRUCTURAL TENSIONING SYSTEM

FIELD OF THE INVENTION

The present disclosure relates generally to tensioning devices and more particularly to a structural tensioning system having a tensioning device that is configured to selective couple with a pier structure to effect a transfer of a tensional load to a position remote from the pier structure.

BACKGROUND

Pipe and tubing are structural materials that are commonly utilized in the construction and manufacturing trades and are conventionally sized and shaped to meet a vast array of structural and material delivery applications. In the course of construction and manufacturing, there are building requirements that require the use of a tensional mechanism from within an internal bore of a pipe to transfer a tensional load from the internal bore of the pipe to a termination mechanism that is located remote to, outside of, or at a proximal end of the length of pipe. This need is particular noted in the construction of foundation elements.

Conventional foundation elements often include driven pipe piles that are often used to support a multitude of superstructures (structures built above their foundations) or other foundation support applications. Conventionally, driven pipe piles are either end or friction bearing foundation elements and, upon reaching an end bearing or a desired frictional resistance within the soil, the driven pipe piles are terminated. While there exist many conventional methods for coupling the driven pipe pile to the superstructure, in the typical method, the superstructure is fabricated to bolt to or weld to the driven piles upon installation. In other applications, it is known to reinforce and encapsulate the driven pile in concrete.

Conventional helical pipe piles or anchors are typically installed by torqueing the pipe into the ground utilizing a single or series of sized helical plates to engage the pipes into the earth until the helical plates are borne into a strong bearing soil strata capable of supporting a specified load in tension or compression. Sequential piles are coupled together utilizing bolts through the coupling for the connection and torsional resistance during the helical pipe installation process. Typically, upon reaching a specific torque correlated depth capable of supporting the specific desired load, the pile installation is terminated and a specified termination is fixed to the end of the pile for the specific application.

Bolted connections are a common choice for fixation of terminations of driven pile and/or helical pipe piles to accommodate tensional load transfer from within the framework of a structure. Thus, conventionally, upon the proper installation of a helical anchor pile, the pipe section is cut off level within a foundation at a specified point and co-axial holes are drilled into the top of the pipe on opposing sides. Subsequently, a properly sized bolt is mounted through the co-axial holes such that the bolt bisects the cross section of the internal bore of the pipe.

Current practice requires the insertion of a pipe section of a termination plate into or over the pipe pile, and a new construction plate is coupled to the termination plate. In one aspect, it is known to weld the plate and pipe insert to create a new construction plate termination. A sized bolt is then placed through to the opposite side connecting both pipes in a fixed but not positive mounting due to the clearance in the bolt holes to accommodate the bolts. A nut is then placed onto the opposing end of the bolt.

Optionally, it is known to weld a compression bearing plate directly to the pile. This process is expensive and, since most helical pipe piles are galvanized, it creates a considerable health risk to the welder due to the inhalation hazard. The expense of this process can increase of the limited space that is often provided underneath the plate and the pile, which makes it difficult and arduous to make a proper welded connection.

SUMMARY

Described herein is a structural tensioning system and a method of using a tensioning device in a structural tensioning system. In one aspect, the structural tensioning system can comprise means for coupling the tensioning device to a bolt mounted in the internal bore of an installed driven pile and/or helical pipe pile. In this aspect, the pier pipe can have a circumferential wall that defines a pair of opposing openings that are positioned in co-axial relationship and the bolt is configured to be mounted in the pair of opposing openings such that an exposed outer surface of the bolt extends across the inner diameter of the circumferential wall of the pier pipe. In one aspect, the structural tensioning system can be utilized to create tension by resisting applied torque during installation, points of fixation, fastening or for various other applications.

In one aspect, the structural tensioning system can comprise an elongate rod having a threaded distal end and a tensioning device. The tensioning device can comprise an elongate body having a proximal end portion and a distal end portion. In this aspect, the proximal end portion of the elongate body can define an interior bore that extends inwardly from a proximal end of the elongate body co-axial to and along a longitudinal axis of the elongate body. In this aspect, the threaded rod can be sized and otherwise configured to be complementarily received in the interior bore of the proximal end portion of the elongate body of the tensioning device and, if desired, can be locked in the received position.

In a further aspect, the distal end portion of the elongate body can define a) a slot that extends inwardly from a distal end of the elongate body co-axial to and along the longitudinal axis of the elongate body, b) a pair of opposed co-axial elongate openings and, c) a pair of opposed passages that communicate between respective portions of the slot and respective portions of the pair of opposed co-axial elongate openings. In this aspect, a bottom portion of each elongate opening defines a hook shape having a diameter that is configured to receive spaced portions of the outer surface of the bolt that is mounted in the pier pipe when the tensioning device is positioned in a tensioning position. It is contemplated that portions of the slot, the pair of opposed co-axial elongate openings and the pair of opposed passages can be configured to selectively receive the bolt that is mounted in the pier pipe as the tensioning device moves about the bolt during the installation process.

In one aspect, in operation, the rod and the coupled tensioning device can be inserted within the confines of the pipe or cylinder straddling the closest bolt(s) its opening, rotated and then engaged with the bolt in a tensional manner in order to provide a transfer mechanism of tension from the pipe or cylinder through the engaged bolt(s) and further through the threaded tensional rod and into a specifically designed termination positioned outside of the pipe or cylinder. Thus, in one aspect, the structural tensioning system comprises means for creating a positive tensional connection between a structural pipe section that is torqued or driven into the earth creating a load transfer point of termination at its end. The termination point of load transfer can then be utilized as a fixation point for superstructure structural framework or can be grouted or encapsulated in concrete.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

DESCRIPTION OF THE FIGURES

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
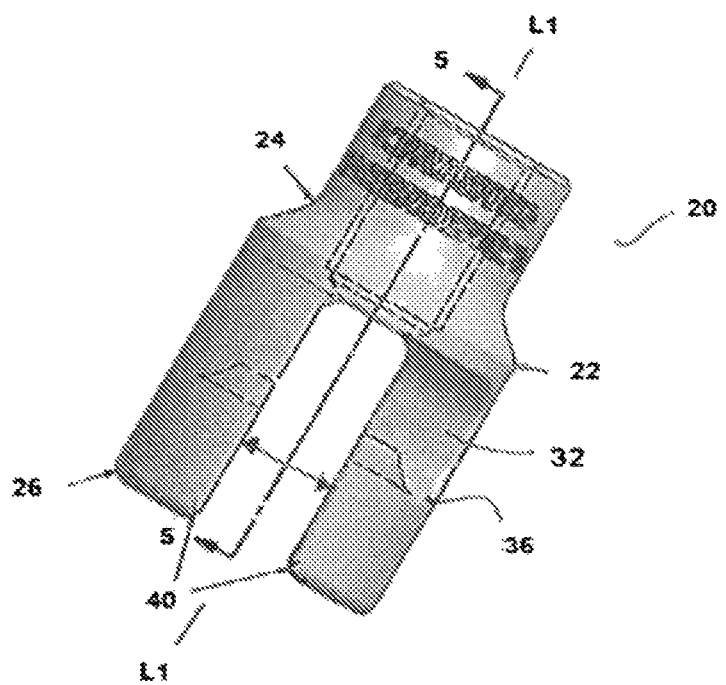
FIG. 1 is a side elevation view of an elongate body of a tensioning device of a structural tensioning system, showing an elongate slot defined in a distal end portion of the elongate body, the elongate slot extending inwardly from a distal end of the elongate body co-axial to and along the longitudinal axis of the elongate body.
Figure 2:
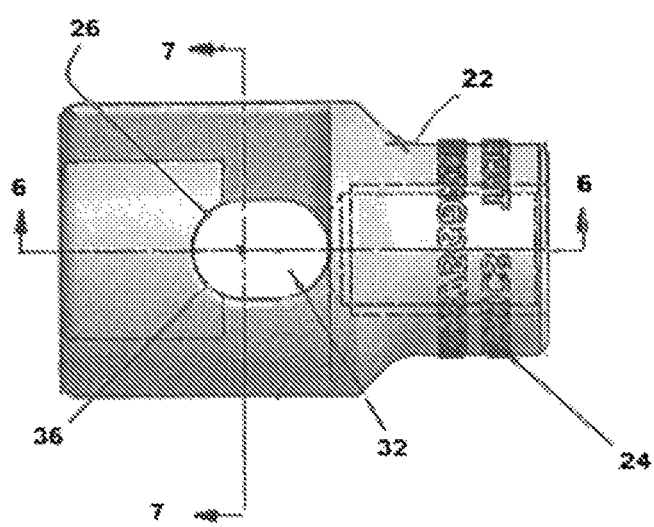
FIG. 2 is a side elevational view of the elongate body of the tensioning device of the structural tensioning system, showing a pair of opposed co-axial elongate openings and a pair of opposed passages that communicate between respective portions of the slot and respective portions of the pair of opposed co-axial elongate openings and showing a bottom portion of each elongate opening defining a hook shape having a diameter that is configured to receive spaced portions of the outer surface of the bolt that is transversely mounted in the pier pipe when the tensioning device is positioned in a tensioning position.
Figure 3:
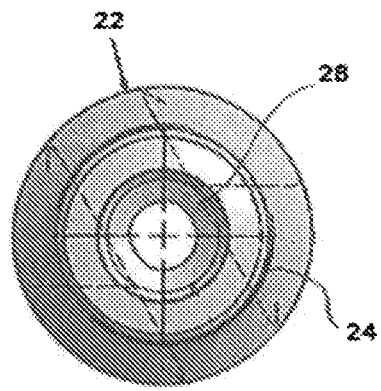
FIG. 3 is a top elevational view of the elongate body of the tensioning device of the structural tensioning system, showing an interior bore defined in a proximal end portion of the elongate body that can that extends inwardly from a proximal end of the elongate body co-axial to and along a longitudinal axis of the elongate body. The interior bore can be threaded or otherwise configured to complementarily receive a threaded end of a threaded rod of the structural tensioning system.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

For clarity, it will be appreciated that this disclosure will focus primarily on the end or cross-sectional views of a locking clamp. As such, it is contemplated that the described cross-section features of the elements forming the locking clamp can also extend the elongate longitudinal length of the respective elements such as, for example and without limitation, the base member, the tongue member and the locking member.

As used throughout, the singular forms "a," "an" and "the" include plural referents unless the context clearly dictates otherwise. Thus, for example, reference to "an opening" can include two or more such openings unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Referring to FIGS. 1 to 17, described herein is a structural tensioning system 10 and a method of using a tensioning device 20 in the structural tensioning system. In one aspect, the structural tensioning system 10 can comprise means for coupling the tensioning device to at least one bolt 2 mounted in the internal bore of an installed driven pile 4 and/or helical pipe pile. In this aspect, the pier pipe can be of conventional construction and can have a circumferential wall that defines a pair of opposing openings 3 that are positioned in co-axial relationship and the bolt 2 is configured to be mounted in the pair of opposing openings such that an exposed outer surface of the bolt extends transversely across the inner diameter of the circumferential wall of the pier pipe. In one aspect, the structural tensioning system 10 can be utilized to create tension by resisting applied torque during installation, points of fixation, fastening or for various other applications.

In one aspect, the structural tensioning system 10 can comprise an elongate rod 12 having a threaded distal end 14 and a tensioning device 20. The tensioning device 20 can comprise an elongate body 22 having a proximal end portion 24 and a distal end portion 26. In this aspect, the proximal end portion 24 of the elongate body can define an interior bore 28 that extends inwardly from a proximal end of the elongate body co-axial to and along a longitudinal axis of the elongate body. In this aspect, the threaded distal end 14 of the threaded rod can be sized and otherwise configured to be complementarily received in the interior bore 28 of the proximal end portion 24 of the elongate body of the tensioning device and, if desired, can be locked in the received position. In one aspect, a locking nut 25 can be placed over the threads of the elongate rod to lock the rod 12 into place relative to the elongate body 22 of the tensioning device.

Figure 4:
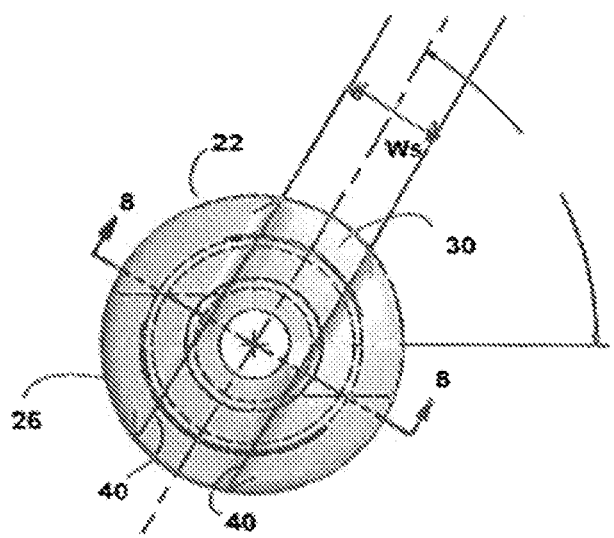
FIG. 4 is a bottom elevational view of the elongate body of the tensioning device of the structural tensioning system, showing the slot defined in the distal end portion and the interior bore defined in the proximal end portion.
Figure 5:
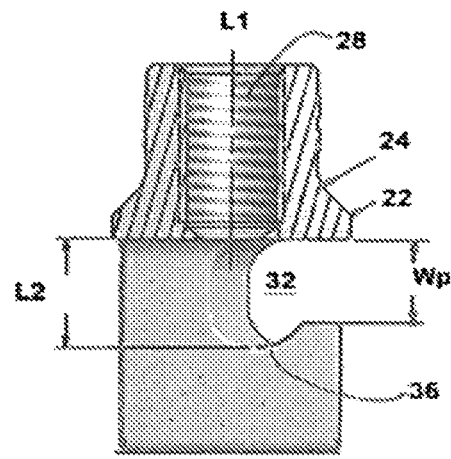
FIG. 5 is a cross-sectional view of the elongate body of FIG. 1, taken across line 5-5 of FIG. 1, showing the slot, a wall portion of the slot and a portion of the passage defined in a portion of the slot wall adjacent an upper stop shoulder, which is configured to position the cross bolt at the same cross sectional level as an upper portions of the pair of opposed co-axial elongate openings.
Figure 6:
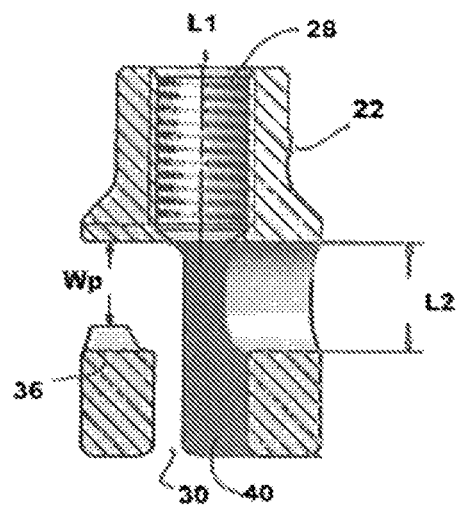
FIG. 6 is a cross-sectional view of the elongate body of FIG. 2, taken across line 6-6 of FIG. 2, showing portions of the slot, the passage, and the elongate opening.
Figure 7:
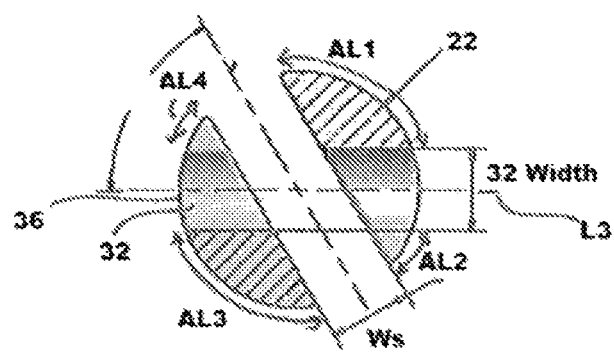
FIG. 7 is a cross-sectional view of the elongate body of FIG. 2, taken across line 7-7 of FIG. 2, showing the angular relationship of the slot and the elongate openings.
Figure 8:
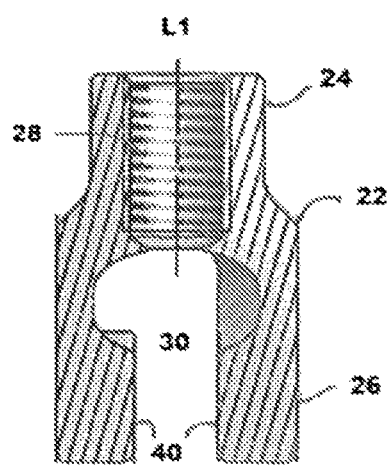
FIG. 8 is a cross-sectional view of the elongate body of FIG. 1, taken across line 8-8 of FIG. 4, showing a view of the elongate body taken transverse to the respective parallel walls of the defined slot.

In a further aspect, the distal end portion 26 of the elongate body 22 can define a) a slot 30 that extends inwardly from a distal end 26 of the elongate body co-axial to and along a plane bisecting the longitudinal axis L1 of the elongate body 22, b) a pair of opposed co-axial elongate openings 32 and, c) a pair of opposed passages 34 that communicate between respective portions of the slot 30 and respective portions of the pair of opposed co-axial elongate openings 32. Referring to FIGS. 1, 4, and 7, in one aspect, the slot 30 can have a width $w_s$ that is configured to accept the outer diameter of the bolt 2 positioned or otherwise mounted in the pier pipe 4.

Referring to FIGS. 1-12, in one aspect, the pair of opposed passages 34 can have a width $w_p$ that is configured to accept the outer diameter of the bolt 2 positioned or otherwise mounted in the pier pipe 4. In a further aspect, the pair of opposed co-axial elongate openings 32 can be elongated along an axis L2 that is parallel to the longitudinal axis of the elongate body and can terminate in a bottom portion 36 that is oriented toward the distal end 26 of the elongate body and can be configured or otherwise shaped to receive portions of the outer surface of the bolt 2 positioned or otherwise mounted in the pier pipe when the tensioning device is positioned in a tensioning position. In one exemplary aspect, as illustrated and without limitation, the bottom portion 36 of each elongate opening 32 can define a hook shape having a diameter that is configured to receive spaced portions of the outer surface of the bolt 2 that is mounted in the pier pipe 4 when the tensioning device is positioned in the tensioning position.

Figure 13:
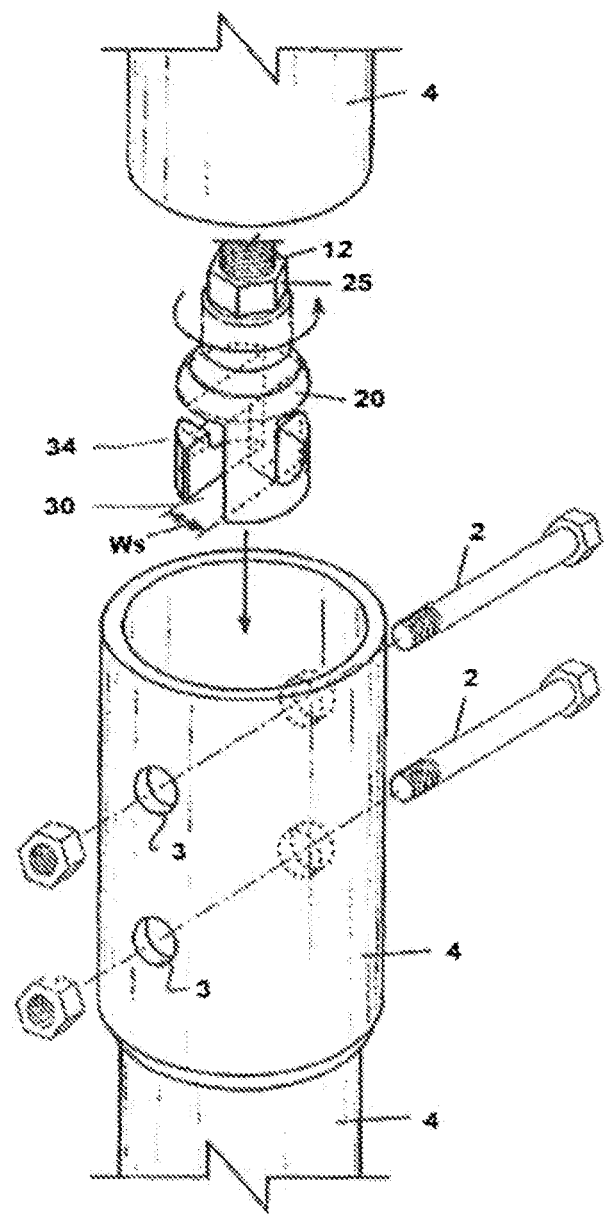
FIG. 13 is a schematic representation of the elongate body of a tensioning device of a structural tensioning system showing the elongate body of FIG. 1 being lowered toward a tensioning position to couple to one bolt of a pair of longitudinally spaced pair of bolts that are transversely mounted in the pier pipe.
Figure 14:
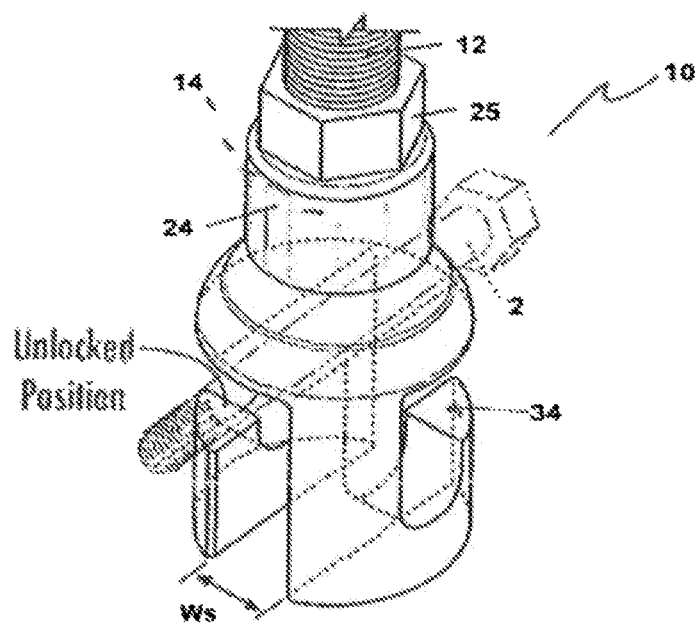
FIG. 14 is a schematic representation of the elongate body of a tensioning device being positioned relative to one bolt of a pair of longitudinally spaced pair of bolts that are transversely mounted in the pier pipe in an unlocked position in which the bolt has been received within the elongate slot such that the bolt is positioned in the plane of the pair of opposed passages of the elongate body.
Figure 15:
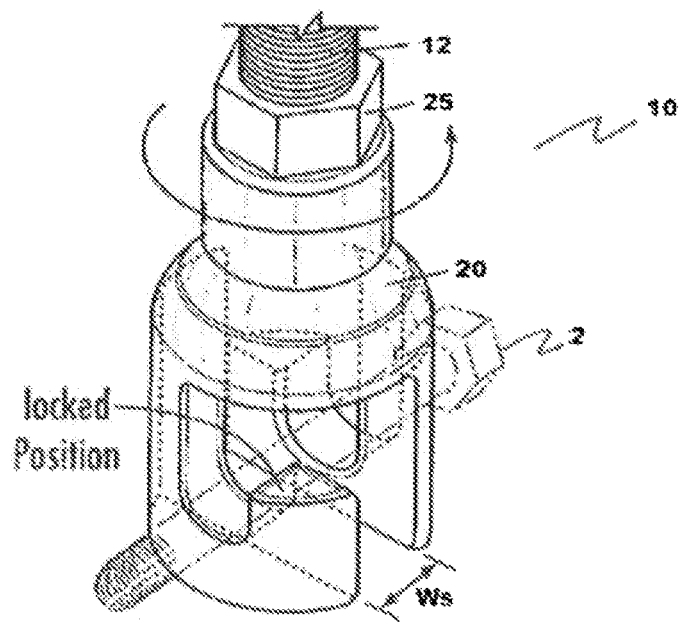
FIG. 15 is a schematic representation of the elongate body of a tensioning device being positioned relative to one bolt of a pair of longitudinally spaced pair of bolts that are transversely mounted in the pier pipe in an locked position in which the elongate body has been rotated to orient the bolt within the pair of opposed co-axial elongate openings of the elongate body and showing the bolt seated in the hook-shaped bottom portion of each elongate opening when the elongate body is in the locked received position.

In a further aspect, and as exemplarily shown in FIGS. 13-15, it is contemplated that portions of the slot 30, the pair of opposed co-axial elongate openings 32 and the pair of opposed passages 34 can be configured to selectively receive the bolt 2 that is mounted in the pier pipe 4 as the tensioning device moves about the bolt during the installation process.

In a further aspect, the slot 30 can define a pair of opposed walls 40 that extend parallel to and spaced equidistant from the longitudinal axis of the elongate body. In another aspect, it is contemplated that the co-axial elongate openings 32 are positioned substantially transverse to the longitudinal axis of the elongate body 22 about an elongate opening axis. In this aspect, and as shown in FIG. 7, the elongate opening axis L3 can be positioned at an acute angle α with respect to a plane bisecting the defined slot 30 parallel to the walls 40. The acute angle α can range between about 20 to about 80 degrees, preferably from between about 50 to about 70 degrees, and most preferred about 60 degrees.

In a further aspect, and shown in FIG. 7, it is preferred that the combined arcuate lengths $AL_1$, $AL_2$, $AL_3$, and $AL_4$ of the arcuate circumferential external surfaces 50 of the elongate body 22 that extends between respective portions of the elongate openings and the respective adjacent wall of the slot can comprise at least about 20%, preferably at least about 35% and more preferred at least about 40% of the circumference of the elongate body in cross section 7-7. Optionally, it is contemplated that the longitudinal distance between the most distal portion of the bottom portion 36 of the elongate openings 32 and the distal end of the elongate body $w_b$ can be substantially the same as the arcuate lengths $AL_1$ and $AL_2$ of the arcuate circumferential external surface of the elongate body that extends between respective portions of one elongate openings and the respective adjacent wall of the slot. As shown, it is contemplated that the arcuate lengths $AL_1$ and $AL_2$ are substantially equal and the arcuate lengths $AL_3$, and $AL_4$ are substantially equal.

Figure 9:
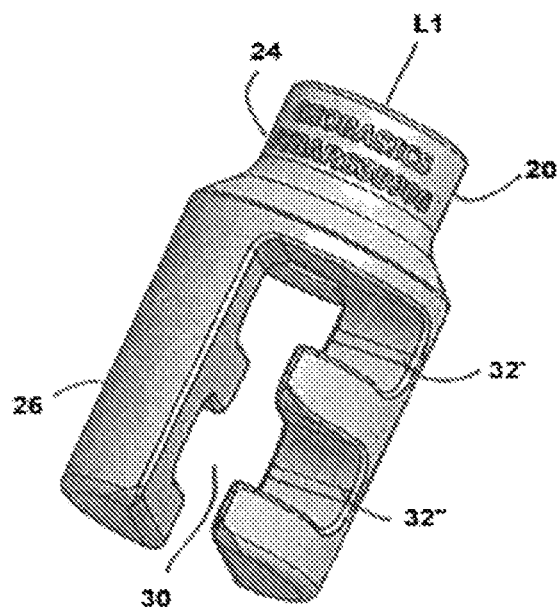
FIG. 9 is a perspective view of an elongate body of a tensioning device of a structural tensioning system, showing an elongate slot defined in a distal end portion of the elongate body, the elongate slot extending inwardly from a distal end of the elongate body co-axial to and along the longitudinal axis of the elongate body, and showing two spaced pairs of opposed co-axial elongate openings and two spaces pairs of opposed passages that communicate between respective portions of the slot and respective portions of the pair of opposed co-axial elongate openings and showing a bottom portion of each elongate opening defining a hook shape having a diameter that is configured to receive spaced portions of the outer surface of a longitudinally spaced pair of bolts that are transversely mounted in the pier pipe when the tensioning device is positioned in a tensioning position.
Figure 10:
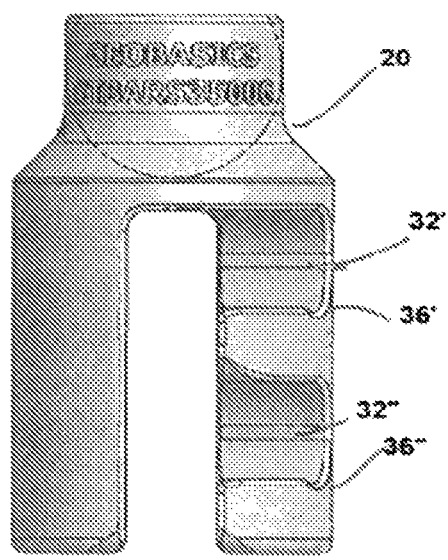
FIG. 10 is a side elevational view of the elongate body of FIG. 9.
Figure 11:
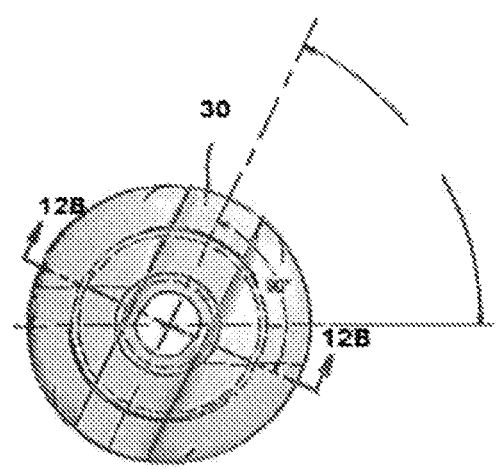
FIG. 11 is a bottom elevational view of the elongate body of FIG. 9, showing the slot defined in the distal end portion and the interior bore defined in the proximal end portion.
Figure 12:
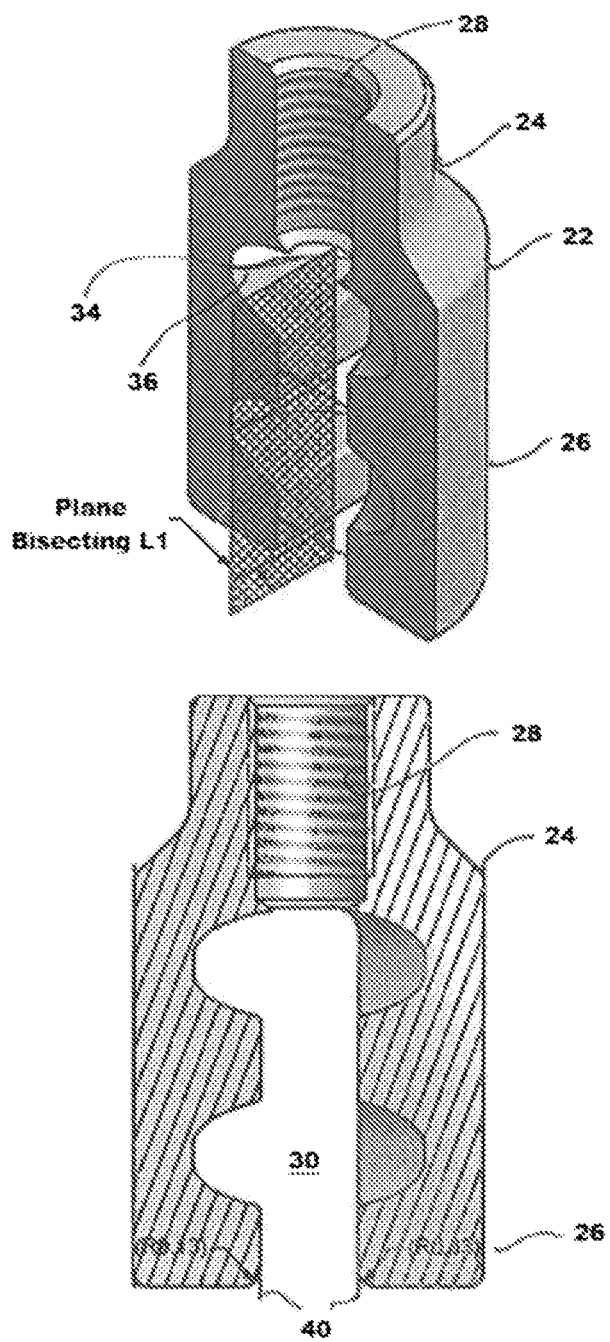
FIGS. 12A and 12B are perspective and side cross-sectional views of the elongate body of FIG. 9, taken across line 12-12 of FIG. 11, showing an elongate slot defined in a distal end portion of the elongate body, the elongate slot extending inwardly from a distal end of the elongate body co-axial to and along the longitudinal axis of the elongate body, and showing two spaced pairs of opposed co-axial elongate openings and two spaces pairs of opposed passages that communicate between respective portions of the slot and respective portions of the pair of opposed co-axial elongate openings.

Referring now to FIG. 9, it is contemplated that the elongate body 22 of the tensioning device 20 for the structural tensioning system 10 can comprise two pairs of opposed co-axial elongate openings 32', 32" and two spaced pairs of opposed passages 34', 34" that communicate between respective portions of the slot 30 and that are spaced along the longitudinal axis of the elongate body. In this aspect, the elongate slot 30 is defined in the distal end portion 26 of the elongate body 22 and extends inwardly from the distal end of the elongate body co-axial to and along a plane bisecting the longitudinal axis of the elongate body 22. As shown in the figures, the two spaced pairs of opposed co-axial elongate openings 32', 32" and two spaces pairs of opposed passages 34', 34" are configured to communicate between respective portions of the slot and respective portions of the pair of opposed co-axial elongate openings. Further, similar to the embodiment shown in FIGS. 1-9, it is contemplated that the bottom portion 36 of each elongate openings 34', 34" defines a hook shape having a diameter that is configured to receive spaced portions of the outer surface of two longitudinally spaced pair of bolts 2 that are transversely mounted in the pier pipe 4.

In this aspect, the interior bore 28 that is defined in a proximal end portion 24 of the elongate body 22 extends inwardly from the proximal end of the elongate body co-axial to and long a longitudinal axis of the elongate body and can be threaded or otherwise configured to complementarily receive a threaded end 14 of a threaded rod 12 of the structural tensioning system.

In one aspect, it is contemplated that the elongate body 22 can be formed from a high strength metal or metal alloy. In one aspect, for example and without limitation, the elongate body 22 can be formed as an integral, single piece casting constructed a high strength steel alloy, which results in a light-weight, high strength tensioning device. In another non-limiting example, and without limitation, the elongate body 22 can be a single piece forging constructed of high strength steel alloy in which the bottom portion 36 of the elongate openings 32 that forms the hook shapes are configured for bolt or pin capture are forged and machined.

It is also contemplated, for example and without limitation, that the elongate body 22 can be a grouping of fabricated parts welded or otherwise formed into a single unit. In this aspect, the bottom portion 36 of the elongate openings 32 that forms the hook shapes that are configured for bolt or pin capture can be made from steel alloy and can, exemplarily be attached by welding.

Figure 18:
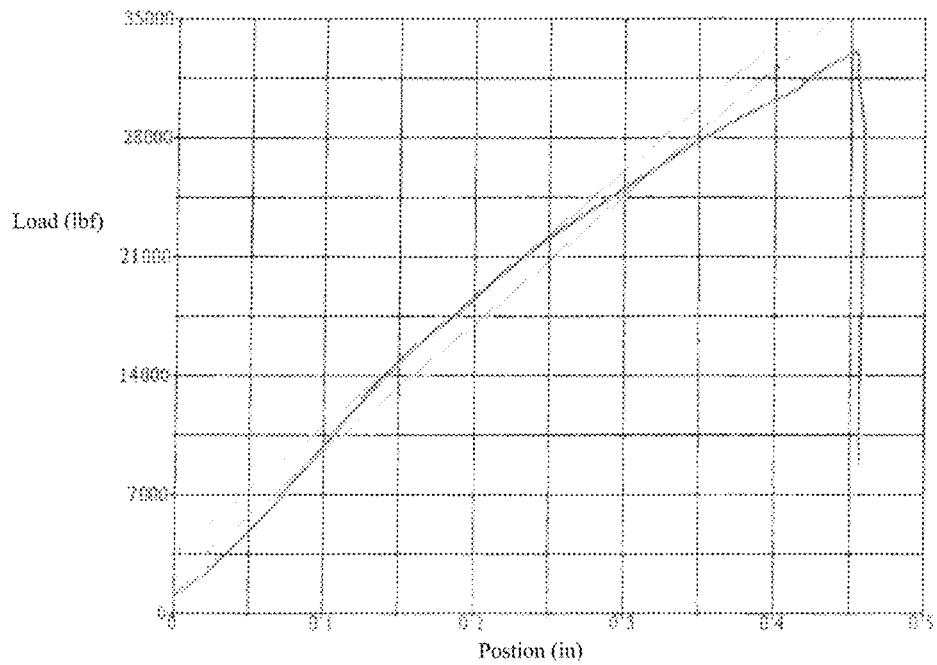
FIG. 18 is a graph of an ASTM A370-Clevis Load test performed on the elongate body of FIG. 1 for a tensioning device of a structural tensioning system.
Figure 19:
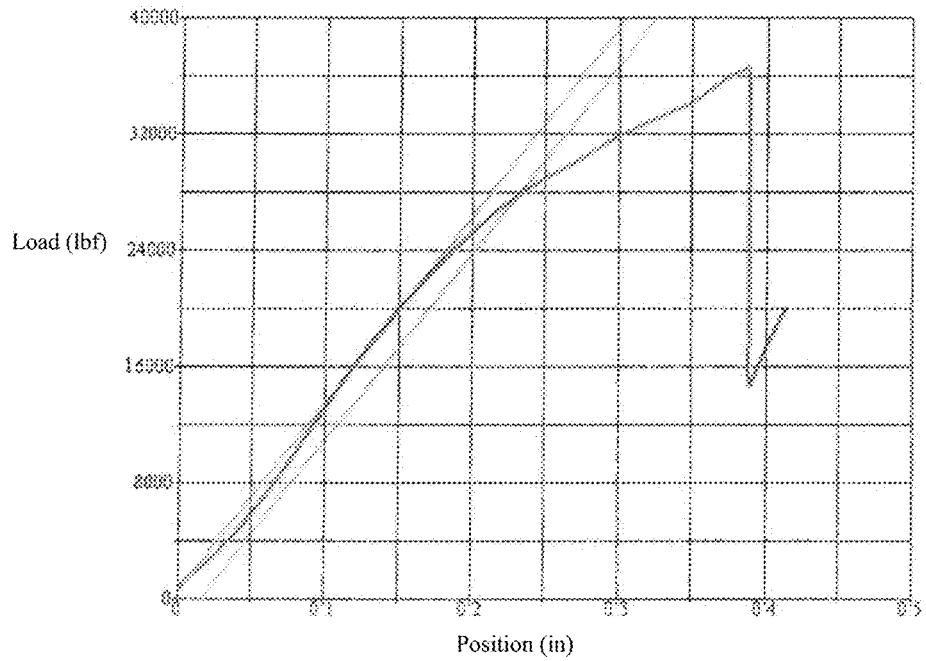
FIG. 19 is a graph of an ASTM A370-Clevis Load test performed on the elongate body of FIG. 1 for a tensioning device of a structural tensioning system.

In one aspect, the tensioning device 20 can be left uncoated or can be coated by any one of numerous methods that resist corrosion and need little maintenance. In a further aspect and referring to FIGS. 18 and 19, it is contemplated that the tensioning device 20 can be formed of a material that can withstand a tension loading of at least about 20,000 lbs., preferably at least about 30,000 lbs., and most preferred, at least about 40,000 lbs.

In a further aspect and referring to FIGS. 13-17, in operation, the elongate rod 12 and the coupled tensioning device 20 can be inserted within the confines of the pipe or cylinder with the slot straddling the closest bolt(s), the elongate rod 12 can be rotated such that the bolt(s) bass through the pairs of opposed passages 34 and into the pairs of opposed elongate opening 32. Subsequently, the elongate rod can be drawn up axially to seat the bolt(s) into the bottom portions of the opposed elongate openings 32 and can be tensioned with the bolt 2 in a tensional manner in order to provide a transfer mechanism of tension from the pipe 4 or cylinder through the engaged bolt(s) and further through the threaded tensional rod 12 and into a specifically designed termination positioned outside of the pipe or cylinder. Thus, in one aspect, the structural tensioning system 10 can comprises means for creating a positive tensional connection between a structural pipe section that is torqued or driven into the earth creating a load transfer point of termination at its end. The termination point of load transfer, for example and without limitation, can then be utilized as a fixation point for superstructure structural framework, it can be grouted or encapsulated in concrete, and/or the like.

Figure 16:
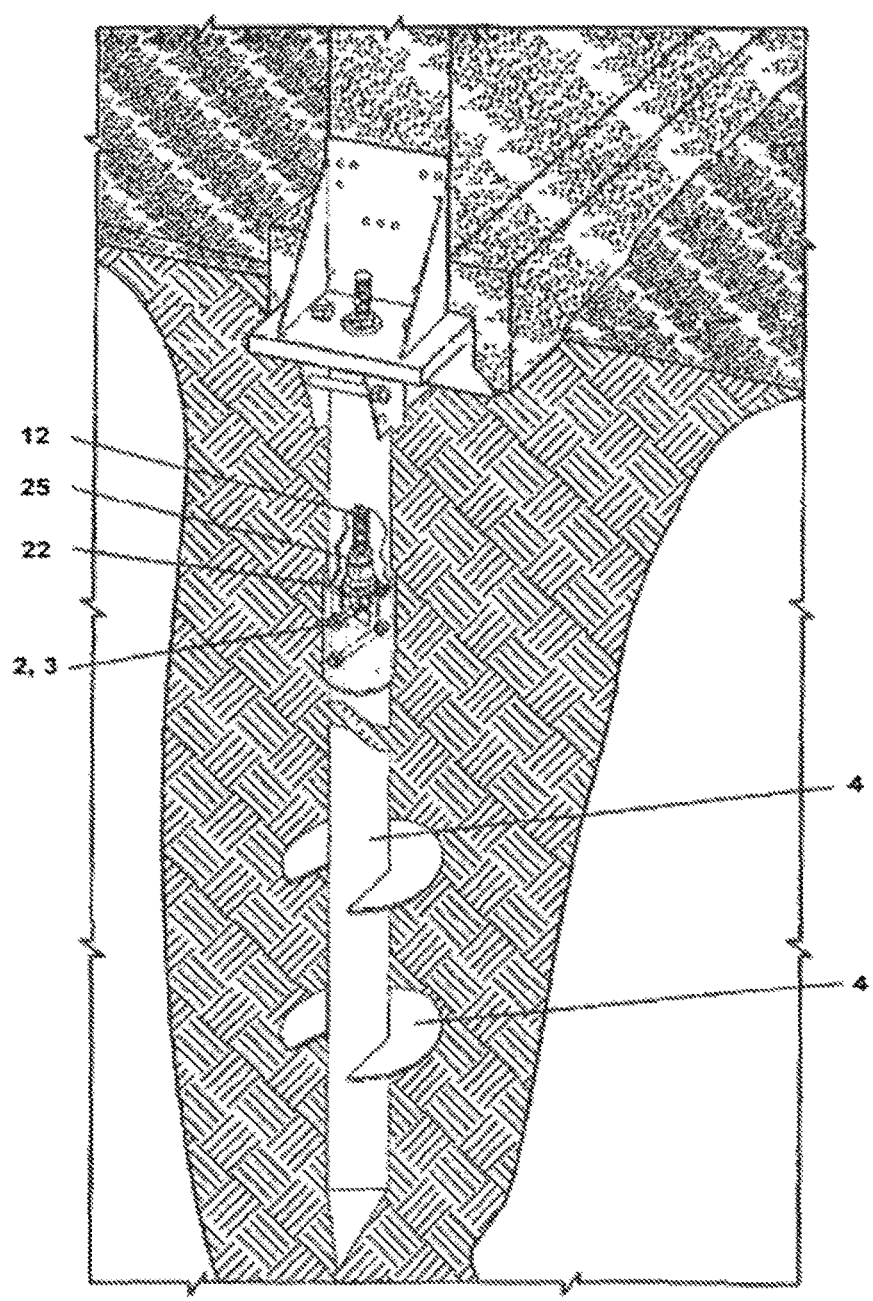
FIG. 16 is a schematic representation of the elongate body of a tensioning device operatively positioned in a tensioning position by the tensioning system of the present invention, and showing the tensioning system being used in an uplift-restraint bracket application.
Figure 17:
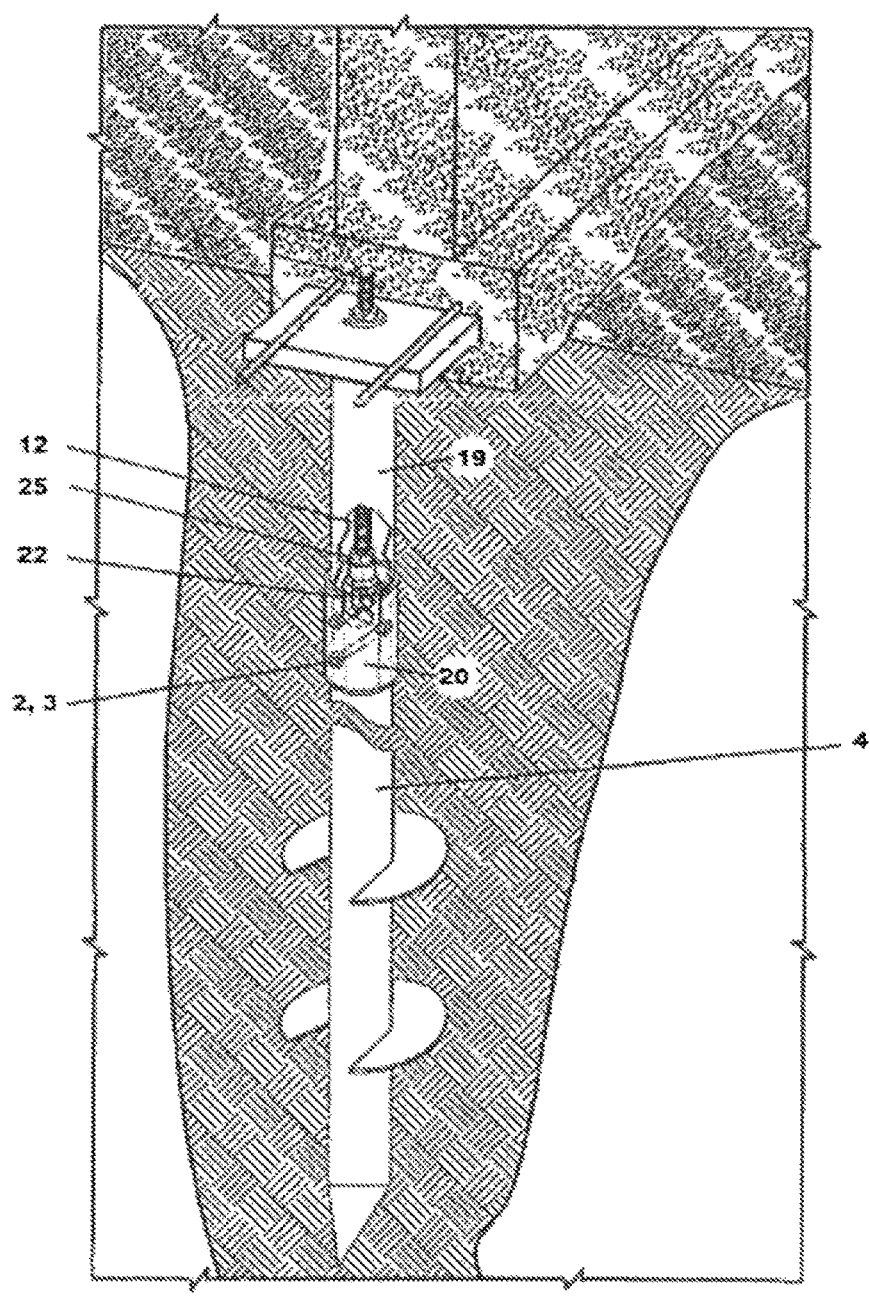
FIG. 17 is a schematic representation of the elongate body of a tensioning device operatively positioned in a tensioning position by the tensioning system of the present invention, and showing the tensioning system being used in a construction application.

As one skilled in the art will appreciate and as shown in FIGS. 13 and 14, once the distal end of the treaded rod 12 is coupled to the interior bore of the proximal end portion 24 of the tensioning device 20, the tensioning device can be lowered through the center of a piece of tubing or pipe 4 that contains the mounted cross bolt or pin. The slot 30 of the elongate body 22 is configured to pass over the cross bolt or pin 2 until the cross bolt or pin is positioned adjacent an upper stop shoulder 33, which positions the cross bolt at the same cross sectional level as an upper portions 37 of the pair of opposed co-axial elongate openings 32. Subsequently, and as shown in FIG. 15, the threaded rod 12 can be rotated, which effects a complementary rotation of the elongate body 22 about its longitudinal axis, and the cross bolt or pin passes through the respective the pairs of opposed passages 34 and into the upper portions of the pair of opposed co-axial elongate openings 32. Subsequently, as the threaded rod 12 is drawn axially in a proximal direction, the cross bolt or pin moves to the tensioning position and becomes seated in the bottom portion 36 of the pair of opposed co-axial elongate openings 32. Once engaged, as schematically illustrated in FIGS. 16 and 17, the threaded rod 12 that is affixed to the elongate body 22 of the tensioning device 20 can be inserted into a specified termination at the end of the pipe or cylinder and subsequently fitted with a corresponding nut, which allows the nut to be used to thread onto a plate or specific termination. Thus, as one skilled in the art, this configuration engages the threaded rod 12 into a tensional state and transfers a specific design tension load from the cross bolt, pin or rod located within the shaft of the pipe or cylinder through the threaded rod and ultimately the specified designed termination.

While this invention has been described in conjunction with particular reference to specific preferred embodiments thereof, it is evident that many alternatives, variations, and modifications will be apparent to those skilled in the art. The invention is intended to embrace all such alternatives, variations, and modifications as fall within the spirit and scope of the invention as described hereinbefore and as-defined in the appended claims.

What is claimed is:

1. A structural tensioning system for selective coupling to a pier pipe, the pier pipe having a circumferential wall that defines a pair of opposing openings that are positioned in co-axial relationship and a bolt that is mounted in the pair of opposing openings and that has an exposed outer surface extends across the inner diameter of the circumferential wall of the pier pipe, comprising:
a tensioning device comprising:
an elongate body having a proximal end portion and a distal end portion, wherein the proximal end portion of the elongate body defines an interior bore that extends inwardly from a proximal end of the elongate body co-axial to and along a longitudinal axis of the elongate body, the interior bore having a first diameter, wherein the distal end portion of the elongate body defines a slot that extends inwardly from a distal end of the elongate body co-axial to and along a plane bisecting the longitudinal axis of the elongate body, a pair of opposed co-axial elongate openings and a pair of opposed passages that communicate between respective portions of the slot and respective portions of the pair of opposed co-axial elongate openings, wherein a bottom portion of each elongate opening defines a hook shape having a diameter that is configured to receive the bolt that is mounted in the pier pipe when the tensioning device is positioned in a tensioning position,
wherein portions of the slot, the pair of opposed co-axial elongate openings and the pair of opposed passages are configured to selectively receive the bolt that is mounted in the pier pipe.

2. The structural tensioning system of claim 1, further comprising an elongate rod having a threaded distal end configured to be received therein the interior bore of the proximal end of the elongate body.

3. The structural tensioning system of claim 1, wherein the slot defines a pair of opposed walls that extend parallel to and spaced equidistant from the longitudinal axis of the elongate body.

4. The structural tensioning system of claim 1, wherein the co-axial elongate openings are positioned substantially transverse to the longitudinal axis of the elongate body about an elongate opening axis.

5. The structural tensioning system of claim 4, wherein the elongate opening axis is positioned at an acute angle $\alpha$ with respect to a plane bisecting the slot.

6. The structural tensioning system of claim 5, wherein the acute angle $\alpha$ ranges between about 50 to about 70 degrees.

7. The structural tensioning system of claim 5, wherein the acute angle $\alpha$ is about 60 degrees.

8. The structural tensioning system of claim 1, wherein, in cross-section, the combined arcuate lengths $L_1$, $L_2$, $L_3$, and $L_4$ of the arcuate circumferential external surfaces of the elongate body that extends between respective portions of the elongate openings and the respective adjacent wall of the slot can comprise at least about 20% of the circumference of the elongate body.

9. The structural tensioning system of claim 8, wherein a longitudinal distance between the most distal portion of the bottom portion of the elongate openings and the distal end of the elongate body are substantially the same as each of the arcuate lengths $L_1$ and $L_2$ of the arcuate circumferential external surface of the elongate body, which extend between respective portions of one elongate opening and the respective adjacent wall of the slot.

10. The structural tensioning system of claim 1, wherein, in cross-section, the combined arcuate lengths $L_1$, $L_2$, $L_3$, and $L_4$ of the arcuate circumferential external surfaces of the elongate body that extends between respective portions of the elongate openings and the respective adjacent wall of the slot can comprise at least about 40% of the circumference of the elongate body.

11. The structural tensioning system of claim 1, wherein the elongate body is formed from a high strength metal or metal alloy.

12. The structural tensioning system of claim 11, wherein the metal alloy is a high strength steel alloy.

13. The structural tensioning system of claim 1, wherein the elongate body is formed as an integral, single piece casting.

14. The structural tensioning system of claim 11, wherein elongate body is formed to withstand a tension loading of at least about 20,000 lbs.

15. The structural tensioning system of claim 11, wherein elongate body is formed to withstand a tension loading of at least about 30,000 lbs.

16. The structural tensioning system of claim 11, wherein elongate body is formed to withstand a tension loading of at least about 40,000 lbs.

17. A tensioning device for use in a structural tensioning system, comprising:
- an elongate body having a proximal end portion and a distal end portion, wherein the proximal end portion of the elongate body defines an interior bore that extends inwardly from a proximal end of the elongate body co-axial to and along a longitudinal axis of the elongate body, the interior bore having a first diameter,
- wherein the distal end portion of the elongate body defines a slot that extends inwardly from a distal end of the elongate body co-axial to and along a plane bisecting the longitudinal axis of the elongate body, a pair of opposed co-axial elongate openings and a pair of opposed passages that communicate between respective portions of the slot and respective portions of the pair of opposed co-axial elongate openings,
- wherein a bottom portion of each elongate opening defines a hook shape having a diameter that is configured to receive the bolt that is mounted in the pier pipe when the tensioning device is positioned in a tensioning position,
- wherein portions of the slot, the pair of opposed co-axial elongate openings and the pair of opposed passages are configured to selectively receive a bolt that is mounted in a pier pipe,
- wherein the co-axial elongate openings are positioned substantially transverse to the longitudinal axis of the elongate body about an elongate opening axis,
- wherein the elongate opening axis is positioned at an acute angle $\alpha$ with respect to a plane bisecting the slot and wherein the acute angle $\alpha$ between about 50 to about 70 degrees.

18. The tensioning device of claim 17, wherein the slot defines a pair of opposed walls that extend parallel to and spaced equidistant from the longitudinal axis of the elongate body.

19. The tensioning device system of claim 17, wherein, in cross-section, the combined arcuate lengths $L_1$, $L_2$, $L_3$, and $L_4$ of the arcuate circumferential external surfaces of the elongate body that extends between respective portions of the elongate openings and the respective adjacent wall of the slot can comprise at least about 20% of the circumference of the elongate body.

20. The tensioning device of claim 19, wherein a longitudinal distance between the most distal portion of the bottom portion of the elongate openings and the distal end of the elongate body are substantially the same as each of the arcuate lengths $L_1$ and $L_2$ of the arcuate circumferential external surface of the elongate body, which extend between respective portions of one elongate opening and the respective adjacent wall of the slot.

21. The tensioning device of claim 17, wherein, in cross-section, the combined arcuate lengths $L_1$, $L_2$, $L_3$, and $L_4$ of the arcuate circumferential external surfaces of the elongate body that extends between respective portions of the elongate openings and the respective adjacent wall of the slot can comprise at least about 40% of the circumference of the elongate body.

22. The tensioning device of claim 17, wherein the elongate body is formed from a high strength metal or metal alloy.

23. The tensioning device of claim 22, wherein elongate body is formed to withstand a tension loading of at least about 30,000 lbs.

24. The tensioning device of claim 22, wherein elongate body is formed to withstand a tension loading of at least about 40,000 lbs.

25. The tensioning device of claim 17, wherein the elongate body is formed as an integral, single piece casting.

* * * * *